United States Patent
Laleg et al.

(10) Patent No.: US 10,773,211 B2
(45) Date of Patent: Sep. 15, 2020

(54) SMART MEMBRANES FOR MONITORING MEMBRANE BASED DESALINATION PROCESSES

(71) Applicant: King Abdullah University of Science and Technology, Thuwal (SA)

(72) Inventors: Taous Meriem Laleg, Thuwal (SA); Ayman Mustafa Karam, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 35 days.

(21) Appl. No.: 16/090,475

(22) PCT Filed: Apr. 3, 2017

(86) PCT No.: PCT/IB2017/051894
§ 371 (c)(1),
(2) Date: Oct. 1, 2018

(87) PCT Pub. No.: WO2017/175115
PCT Pub. Date: Oct. 12, 2017

(65) Prior Publication Data
US 2019/0111392 A1    Apr. 18, 2019

Related U.S. Application Data

(60) Provisional application No. 62/318,008, filed on Apr. 4, 2016.

(51) Int. Cl.
*B01D 61/36* (2006.01)
*B01D 65/10* (2006.01)
*G01N 17/00* (2006.01)

(52) U.S. Cl.
CPC ......... *B01D 61/364* (2013.01); *B01D 61/368* (2013.01); *B01D 65/10* (2013.01);
(Continued)

(58) Field of Classification Search
CPC .... B01D 61/364; B01D 61/368; B01D 65/10; B01D 2313/345; B01D 2325/021;
(Continued)

(56) References Cited

U.S. PATENT DOCUMENTS 6,054,051 A * 4/2000 van Reis ............... B01D 61/14
                                                     210/195.2
6,214,221 B1 * 4/2001 Kopf ..................... B01D 15/361
                                                     210/198.2
(Continued)

FOREIGN PATENT DOCUMENTS

WO      2009033226      3/2009

OTHER PUBLICATIONS

Chilcott, et al., "Electrical impedance spectroscopy characterisation of conducting membranes—I. Theory", Journal of Membrane Sci, Elsevier BV, NL,vol. 195, No. 2, Jan. 31, 2002, pp. 153-167.
(Continued)

*Primary Examiner* — Joseph W Drodge
(74) *Attorney, Agent, or Firm* — Patent Portfolio Builders PLLC

(57) ABSTRACT

Various examples are related to smart membranes for monitoring membrane based process such as, e.g., membrane distillation processes. In one example, a membrane, includes a porous surface and a plurality of sensors (e.g., temperature, flow and/or impedance sensors) mounted on the porous surface. In another example, a membrane distillation (MD) process includes the membrane. Processing circuitry can be configured to monitor outputs of the plurality of sensors. The monitored outputs can be used to determine membrane degradation, membrane fouling, or to provide an indication of membrane replacement or cleaning. The sensors can also
(Continued)

provide temperatures or temperature differentials across the porous surface, which can be used to improve modeling or control the MD process.

18 Claims, 3 Drawing Sheets

(52) U.S. Cl.
CPC ..... *G01N 17/008* (2013.01); *B01D 2313/345* (2013.01); *B01D 2325/021* (2013.01); *Y02A 20/131* (2018.01)

(58) Field of Classification Search
CPC ........ B01D 61/10; B01D 61/12; B01D 61/20; B01D 61/22; B01D 61/30; B01D 61/32; B01D 61/36; B01D 65/08; B01D 2311/04; B01D 2311/16; B01D 2311/165; B01D 2311/24; B01D 2311/246; B01D 2311/2669; B01D 2313/65; B01D 2321/40; G01N 17/008; Y02A 20/131; C02F 1/44; C02F 1/441; C02F 1/442; C02F 1/444; C02F 1/447; C02F 2209/005; C02F 2209/006; C02F 2209/02; C02F 2209/03; C02F 2209/40
USPC ... 210/640, 649, 650, 739, 741, 742, 85, 87, 210/90, 96.2, 143, 149
See application file for complete search history.

(56) References Cited

U.S. PATENT DOCUMENTS

| | | | | |
|---|---|---|---|---|
| 6,471,853 B1* | 10/2002 | Moscaritolo | ......... | B01D 35/143 210/143 |
| 6,852,216 B2* | 2/2005 | Moscaritolo | ......... | B01D 29/603 210/85 |
| 8,454,822 B2* | 6/2013 | Morrissey | ............ | B01D 61/20 210/90 |
| 2005/0067341 A1* | 3/2005 | Green | .................. | B01D 61/142 210/321.69 |
| 2005/0251366 A1* | 11/2005 | Kahn | ..................... | G01N 33/18 702/188 |
| 2007/0132043 A1* | 6/2007 | Bradley | ................. | B82Y 10/00 257/414 |
| 2007/0209977 A1* | 9/2007 | Wilf | ..................... | B01D 61/025 210/85 |
| 2007/0243113 A1* | 10/2007 | DiLeo | .................... | B01D 29/60 422/119 |
| 2008/0093226 A1* | 4/2008 | Briman | ................ | G01N 27/127 205/775 |
| 2010/0230766 A1* | 9/2010 | Elian | ..................... | G01L 19/147 257/414 |
| 2014/0000346 A1* | 1/2014 | Hoek | .................... | B01D 61/025 73/38 |
| 2014/0091020 A1 | 4/2014 | Burke et al. | | |
| 2015/0248949 A1* | 9/2015 | Bayley | ..................... | B32B 9/00 174/258 |

OTHER PUBLICATIONS

Farah, et al., "Electrically conductive polymeric membranes for fouling prevention and detection: A review", Desalination., vol. 391, Feb. 20, 2015, pp. 1-15.

Hendren, et al., "Surface modification of nanostructured ceramic membranes for direct contact membrane distillation", Journal of Membrane Science, Elsevier BV, NL, vol. 331, No. 1-2, Apr. 1, 2009, pp. 1-10.

Izquierdo-Gi, et al., "Flow rate influence on direct contact membrane distillation experiments: Different empirical correlations for Nusselt number", Journal of Membrane Science, Elsevier BV, NL, vol. 321, No. 2, Aug. 15, 2008, pp. 356-363.

Search Report and Written Opinion for PCT/IB2017/051894 dated Jun. 9, 2017.

European Office Action for related European Application No. 17716056.1 dated Apr. 16, 2020. (All of the references cited in the European Office Action are already of record.).

* cited by examiner

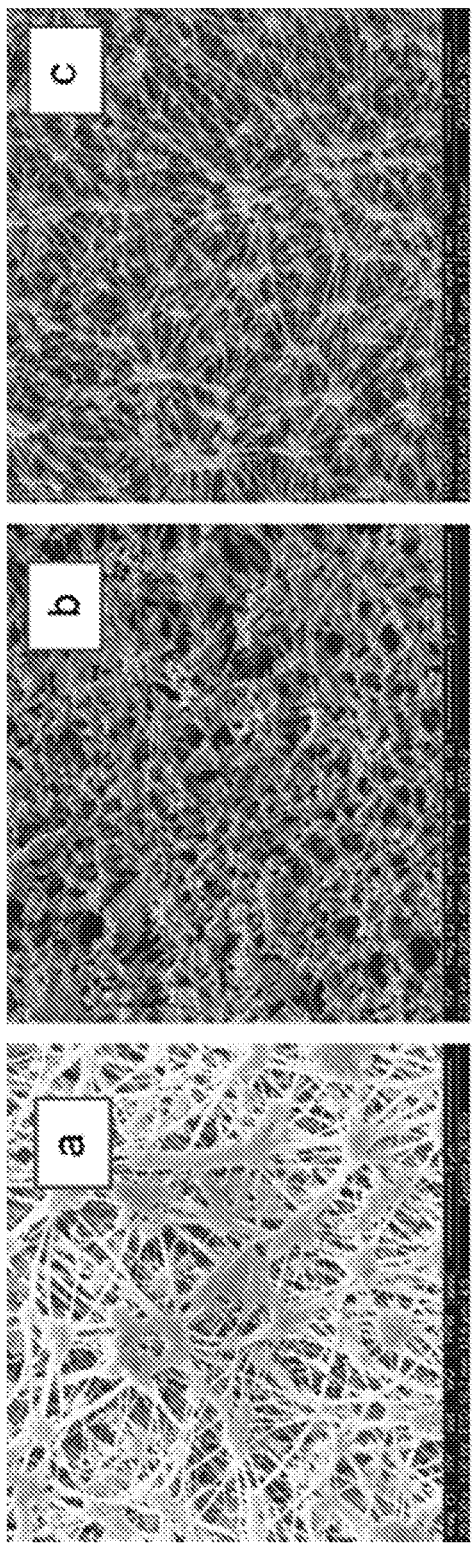
FIG. 1A
FIG. 1B
FIG. 1C
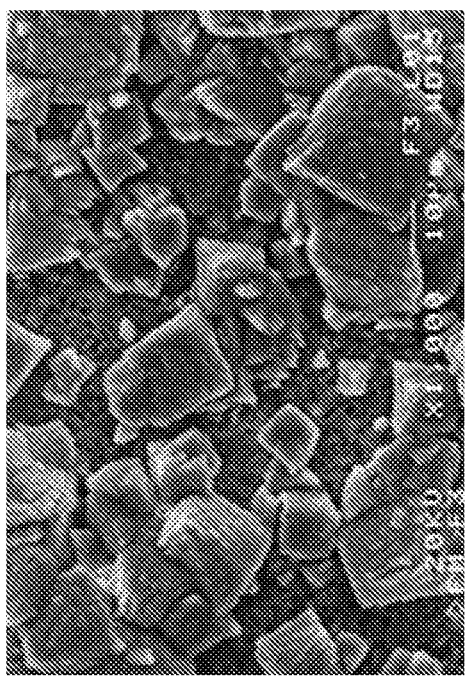
FIG. 2

SMART MEMBRANES FOR MONITORING MEMBRANE BASED DESALINATION PROCESSES

CROSS REFERENCE TO RELATED APPLICATIONS

This application claims priority to, and the benefit of, U.S. provisional application entitled "Smart Membranes for Monitoring Membrane Based Desalination Processes" having Ser. No. 62/318,008, filed Apr. 4, 2016; which is hereby incorporated by reference in its entirety.

BACKGROUND

Membrane fouling is a process whereby a solution or a particle is deposited on a membrane surface or in membrane pores in a process such as in Membrane Distillation (MD) and Reverse Osmosis (RO), resulting in degraded performance of the membrane. Membrane fouling can cause severe flux decline and affect the quality of the water produced. Severe fouling can even result in intense chemical cleaning or membrane replacement. This in turn increases the energy consumption of the water treatment plant and reduces the process efficiency.

SUMMARY

Various aspects of the present disclosure are related to smart membranes for monitoring membrane based desalination processes.

In one aspect, among others, a membrane comprises a porous surface having a uniform geometry; and a plurality of sensors mounted on the porous surface. In one or more aspects, the plurality of sensors can comprise a temperature sensor, a flow sensor or an impedance sensor, or a combination thereof. The membrane can further comprise a wired network coupled to the plurality of sensors and disposed on the porous surface. The wired network can follow a geometric pattern of the porous surface, which can be defined by pores in the porous surface. In one or more aspects, the plurality of sensors can be mounted on a common side of the porous surface, or can comprise sensors mounted on opposite sides of the porous surface. The plurality of sensors can comprise pairs of sensors that are substantially aligned on opposite sides of the porous surface. A first wired network can be disposed on a first side of the porous surface and coupled to sensors mounted on the first side, and a second wired network can be disposed on a second side of the porous surface opposite the first side and coupled to sensors mounted on the second side.

In another aspect, a membrane distillation (MD) process comprises a membrane comprising a porous surface having a uniform geometry; and a plurality of sensors mounted on the porous surface. In one or more aspects, the MD process can further comprise processing circuitry comprising a processor and memory, the processing circuitry configured to monitor outputs of the plurality of sensors. The processing circuitry can be configured to determine membrane degradation and/or membrane fouling based at least in part upon the monitored outputs of the plurality of sensors. The processing circuitry can be configured to provide an indication of membrane replacement or cleaning based at least in part upon the monitored outputs of the plurality of sensors. In one or more aspects, the processing circuitry can comprise a sensor interface configured for analog-to-digital conversion of sensor signals. The plurality of sensors can comprise a temperature sensor, a flow sensor, an impedance sensor, or a combination thereof. The plurality of sensors can comprise pairs of sensors that are substantially aligned on opposite sides of the porous surface. The processing circuitry can be configured to determine a temperature differential across the porous surface based upon readings of at least one of the pairs of sensors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A, 1B and 1C are scanning electron microscope (SEM) images of examples of porous membranes used in a MD process, in accordance with various embodiments of the present disclosure.

FIG. 2 is a SEM image illustrating fouling of a porous membrane, in accordance with various embodiments of the present disclosure.

DETAILED DESCRIPTION

Figure 3:
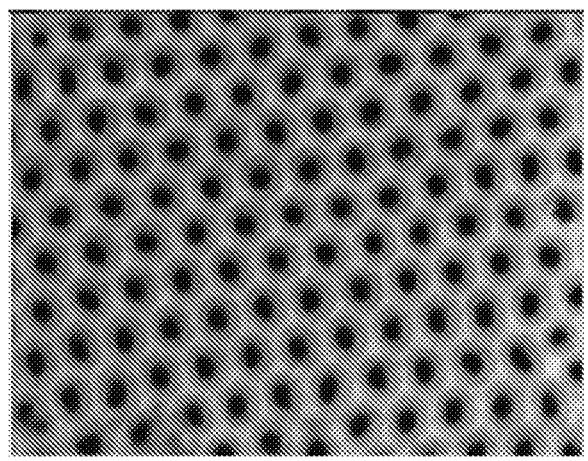
FIG. 3 is a SEM image of an example of a uniform geometric membrane that can be used with integrated temperature sensors, in accordance with various embodiments of the present disclosure.

Disclosed herein are various embodiments related to smart membranes for monitoring membrane based desalination processes. Reference will now be made in detail to the description of the embodiments as illustrated in the drawings, wherein like reference numbers indicate like parts throughout the several views.

Membrane fouling affects all membrane based desalination processes such as reverse osmosis (RO) and membrane distillation (MD). While there are some mechanisms to detect fouling in RO, MD processes are still developing and a methodology to detect fouling is yet to be defined. Evaluation of fouling in MD is needed for commercialization of MD based water desalination. Overcoming this can facilitate the widespread use of MD technology.

A membrane distillation (MD) process is thermal, and includes a transfer of water vapor from a feed container to a permeate container through a micro-porous membrane, and reject other non-volatile constituents present in the influent water. The process is driven by the temperature difference along the membrane boundary layers. In this process, a hot feed solution passes along one side (the feed side) of a microporous hydrophobic membrane, while the other side (the permeate side) of the membrane is kept at a lower temperature (coolant). Due to this temperature difference, water evaporates at the feed-membrane interface, and only water vapor passes through the dry pores of the hydrophobic membrane, driven by the differential saturation vapor pressure across the feed and the permeate sides of the membrane. This gives significance to the temperature distribution along the membrane boundary layers.

Referring to FIGS. 1A-1C, shown are scanning electron microscope (SEM) images of examples of normal membranes used in MD. The images in FIGS. 1A and 1C show examples of polytetrafluoroethylene (PTFE) membranes and image in FIG. 1B shows an example of a polypropylene (PP) membrane. FIG. 2 is a SEM image illustrating the buildup of calcium carbonate scale on a PP membrane surface. Such fouling can significantly impact the MD process.

The solution to membrane fouling is membrane cleaning which can restore the desired characteristics of the membrane. For example, in RO there are manufacturer guidelines that specify how often to clean, but these guidelines do not generally result in the most economical operation of the RO system. Some factors that can affect the total cleaning cost are listed below.

Cost of energy paid by the municipal agency.
Specific fouling rate of the RO system.
The nature of the foulant and cleaning effectiveness.
Total cost of chemical solution.
Labor associated with performing a cleaning.
Lost permeate production due to downtime during cleaning.

While there are some mechanisms to detect fouling in RO, MD processes are still developing and a methodology to detect fouling is yet to be found. Detailed study of fouling in MD can help facilitate commercialization of MD based water desalination. Overcoming this obstacle may lead to the widespread use of MD technology.

Access to some measurements, which provide information on the state of the membrane, can significantly improve the monitoring of a MD process. However, one challenge when studying the MD process is the limited access to such data. Indeed, only inlet and outlet temperatures, inlet and outlet flow-rates and mass flux are generally measured. Mathematical models have been proposed to estimate the surface temperatures of the membrane. Additional temperature measurements at the membrane surface can provide important information on the condition of the membrane.

To enable monitoring of the membrane properties, sensors measuring for example the temperature, the flow rate or the impedance, can be placed directly on the membrane surface at specific locations for the MD process. Measurements coming from these sensors can be used for several applications. First, these measurements can access the temperature at the membrane surface, which is very useful for studying the heat transfer phenomenon and confirmation of mathematical models for MD processes, which can then be used for controlling, optimizing and monitoring the system. The temperature measurements can also be used to adjust the models for more accurate control of the MD process, which may be accomplished in real time. Second, data from these sensors can be used along with a mathematical model to monitor the state of the membrane and study the fouling mechanism. This can be used to predict and identify the fouling process at an early stage and support the decision making for membrane cleaning. In addition, temperature measurement at the surface of a membrane may be generalized to other applications other than MD, like fuel cells and bio reactors.

These sensors can be integrated with MD membranes having uniform geometry, which when combined with the mathematical model can be used to identify the membrane properties. FIG. 3 is a SEM image illustrating an example of a membrane manufactured by SONATE technology with a uniform geometric distribution. The membrane can be a nanoporous ceramic membrane having a geometric pattern of pores extending across the surface of the membrane. The sensors can be located at predefined locations on the membrane surface. For example, an array of sensors can be distributed across the membrane surface or sensors can be positioned at various locations around and inside the outer edges of the membrane. A wire network can be fabricated on the membrane surface to facilitate monitoring of the sensors by a monitoring system. The wire network can follow the geometric distribution of the membrane (such as illustrated in FIG. 3) to reduce interference with mass transfer through the membrane. For example, conductors of the wire network can be positioned between the pores of the membrane. Temperature, flow rate and/or impedance measurements at the membrane surface can be used to predict and identify fouling at an early stage during the MD process, which can aid and support the decision making for membrane cleaning and further reduce the operational cost. The temperature monitoring can also be used to identify problem areas in the membrane for correction or adjustment of the MD process. Moreover, these sensors can be useful during the design of large-scale MD setups helping in optimizing the geometry and efficiency of the process and also allowing for cheaper MD based desalination system.

Figure 4:
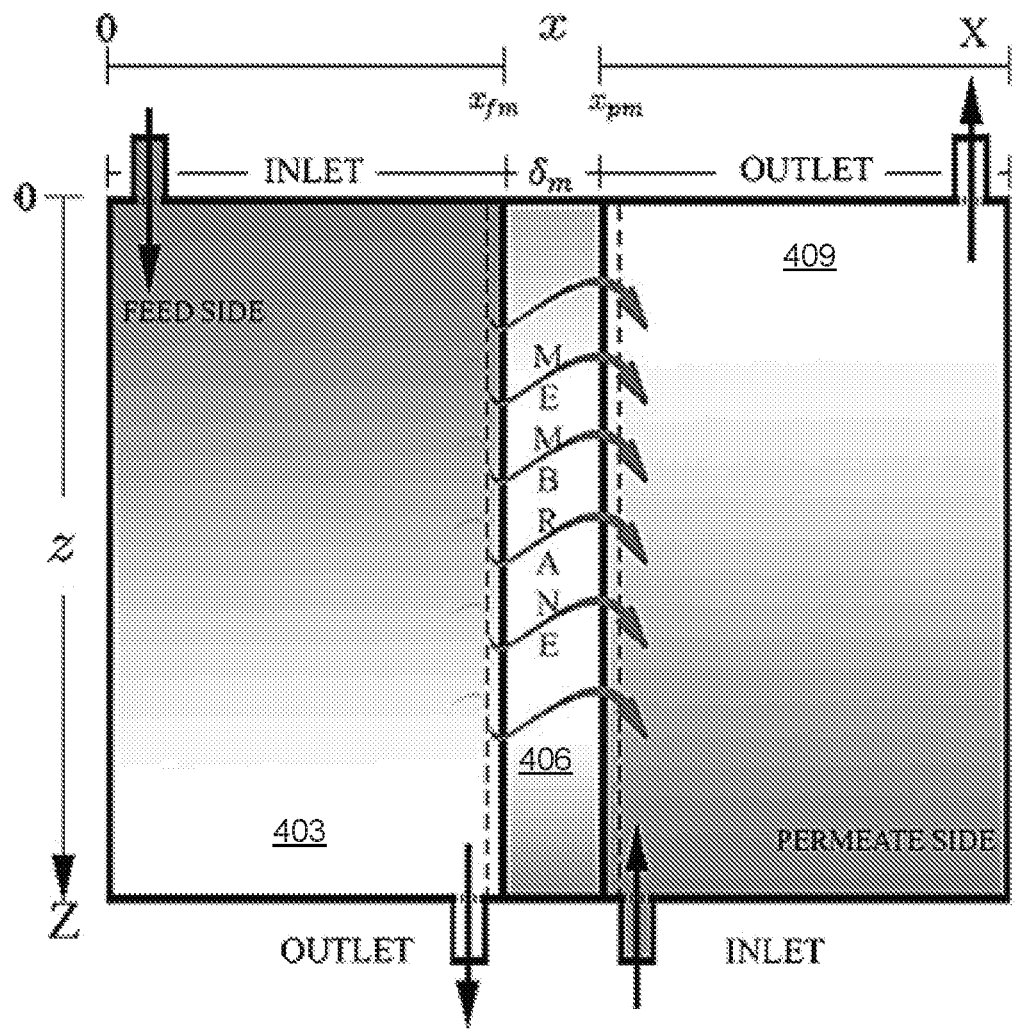
FIG. 4 is a schematic diagram depicting an example of a MD process, in accordance with various embodiments of the present disclosure.

Referring to FIG. 4, shown is an example of a MD process that can utilize uniform geometric membranes with integrated sensors (for example temperature, flow rate, and/or impedance sensors). The MD process includes a feed subsystem 403, a membrane 406, and a permeate subsystem 409. The MD process model considers the module of the membrane to be counter current for the hot and cold water streams. The heat transfer between the feed and the permeate subsystems 403 and 409 is driven by the transmembrane heat flux, and the latent heat of evaporation. Both of them are functions of the temperature difference between the membrane boundary layers of the feed and the permeate subsystems 403 and 409. This temperature difference makes the model nonlinear.

Figure 5:
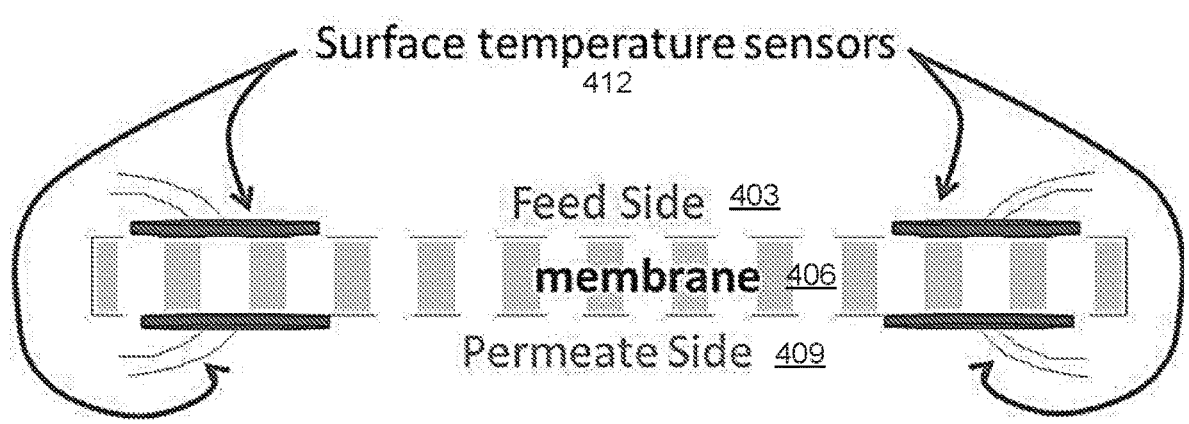
FIG. 5 is a graphical representation of an example of surface sensors integrated with the membrane of the MD process of FIG. 4, in accordance with various embodiments of the present disclosure.

Referring next to FIG. 5, shown is a graphical representation illustrating an example of surface sensors 412 integrated with the membrane 406. In the example of FIG. 5, the surface sensors 412 are temperature sensors, however other types of sensors (e.g., flow sensors, impedance sensors, etc.) are equally applicable and can be utilized separately or in combination. The sensors 412 can be placed on one side of the membrane 406 or both sides of the membrane 406 as shown in FIG. 5. In some implementations, pairs of sensor 412 can be substantially aligned on opposite sides of the membrane 406. For example, temperature sensors can be positioned to monitor temperature differential across the membrane, which can be used to control the MD process and/or update the model in real time or near real time. The sensors 412 can be communicatively coupled to processing circuitry that can monitor outputs of the sensors 412. For example, wire connections can run along or adjacent to the surface of the membrane from the sensor 412 to the processing circuitry.

The processing circuitry can comprise a processor that can be configured to monitor the sensors 412. The processing circuitry can include a sensor interface (e.g., an analog-to-digital converter) to facilitate capture of the temperature (or other sensor) information. The processing circuitry can use the information from the sensors 412 to determine the presence and/or amount of membrane degradation or membrane fouling. The processing circuitry can be configured to provide an indication of the need for membrane replacement or cleaning using the sensor outputs. For example, a program stored in memory can be executed by the processor to monitor the sensor outputs and make the determinations and/or provide the indications. The indication may be provided to control circuitry of the MD process as control feedback, or to provide an indication of fouling to the process operator. Appropriate actions can then be implemented based upon the indication.

The term "substantially" is meant to permit deviations from the descriptive term that do not negatively impact the intended purpose. All descriptive terms used herein are implicitly understood to be modified by the word substantially, even if the descriptive term is not explicitly modified by the word "substantially."

While this disclosure has focused on smart membranes for MD processes, the idea of implementing sensors in membrane's surface can be extended and applied to other membrane-based methods like RO. It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A membrane, comprising:
   a porous surface having a uniform geometry;
   a plurality of sensors mounted on the porous surface, wherein the plurality of sensors include temperature sensors, flow sensors, impedance sensors, or combinations thereof; and
   a wired network coupled to the plurality of sensors and disposed on the porous surface,
   wherein the wired network follows a geometric pattern of the porous surface, and
   wherein the geometric pattern is defined by pores in the porous surface.

2. The membrane of claim 1, wherein the plurality of sensors are mounted on a common side of the porous surface.

3. The membrane of claim 1, wherein the plurality of sensors comprise sensors mounted on opposite sides of the porous surface.

4. The membrane of claim 3, wherein the plurality of sensors comprise pairs of sensors that are substantially aligned on opposite sides of the porous surface.

5. The membrane of claim 4, wherein the pairs of sensors comprise temperature sensors.

6. The membrane of claim 4, wherein the pairs of sensors comprise flow sensors.

7. The membrane of claim 4, wherein the pairs of sensors comprise impedance sensors.

8. The membrane of claim 1, wherein the wired network comprises a first wired network disposed on a first side of the porous surface and coupled to sensors mounted on the first side and a second wired network disposed on a second side of the porous surface opposite the first side and coupled to sensors mounted on the second side.

9. The membrane of claim 1, wherein the wired network is positioned to minimize mass transfer through the membrane.

10. A membrane distillation (MD) system, comprising:
    a membrane comprising:
        a porous surface having a uniform geometric pattern;
        a plurality of sensors mounted on the porous surface, wherein the plurality of sensors include temperature sensors, flow sensors, impedance sensors, or combinations thereof;
        a wired network coupled to the plurality of sensors and disposed on the porous surface; and
        processing circuitry configured to monitor outputs of the plurality of sensors,
    wherein the wired network follows the geometric pattern of the porous surface, and
    wherein the geometric pattern is defined by pores in the porous surface.

11. The MD system of claim 10, wherein the processing circuitry comprises a processor and memory.

12. The MD system of claim 10, wherein the processing circuitry is configured to determine membrane degradation based at least in part upon the monitored outputs of the plurality of sensors.

13. The MD system of claim 10, wherein the processing circuitry is configured to determine membrane fouling based at least in part upon the monitored outputs of the plurality of sensors.

14. The MD system of claim 10, wherein the processing circuitry is configured to provide an indication of a need for membrane replacement or cleaning, based at least in part upon the monitored outputs of the plurality of sensors.

15. The MD system of claim 10, wherein the processing circuitry comprises a sensor interface configured for analog-to-digital conversion of sensor signals generated by the plurality of sensors.

16. The MD system of claim 10, wherein the plurality of sensors comprise pairs of sensors that are substantially aligned on opposite sides of the porous surface.

17. The MD system of claim 16, wherein the processing circuitry is configured to determine a temperature differential across the porous surface based upon readings of at least one of the pairs of sensors that are substantially aligned on opposite sides of the porous surface.

18. The MD system of claim 10, wherein the wired network is positioned to minimize mass transfer through the membrane.

* * * * *